(12) United States Patent
Thornhill

(10) Patent No.: US 6,202,964 B1
(45) Date of Patent: Mar. 20, 2001

(54) MULTI-PURPOSE HANGER

(76) Inventor: Dalbert Thornhill, 608 W. 5th St., Stroud, OK (US) 74079

(*) Notice: Subject to any disclaimer, the term of this patent is extended or adjusted under 35 U.S.C. 154(b) by 0 days.

(21) Appl. No.: 09/340,526

(22) Filed: Jun. 28, 1999

(51) Int. Cl.[7] .................................................. E04G 3/00
(52) U.S. Cl. ................................. 248/219.4; 248/230.8; 248/291.1
(58) Field of Search ........................ 248/218.4, 219.4, 248/219.1, 230.8, 291.1, 284.1, 351; 182/142, 187

(56) References Cited

U.S. PATENT DOCUMENTS

| | | | |
|---|---|---|---|
| 5,263,675 | * 11/1993 | Roberts et al. | 248/219.4 |
| 5,435,412 | * 7/1995 | Franklin, III et al. | 248/219.1 X |
| 5,601,274 | * 2/1997 | Minor et al. | 248/219.1 X |
| 5,632,461 | * 5/1997 | Van Helms et al. | 248/218.4 |
| 5,641,141 | * 6/1997 | Goodwin | 248/218.4 |

* cited by examiner

Primary Examiner—Ramon O. Ramirez
(74) Attorney, Agent, or Firm—Dunlap, Codding & Rogers, P.C.

(57) ABSTRACT

A hanger including a connector member, a strap member, a hanger arm, and an adjustable support arm is provided. The connecting member has a surface configured to substantially conform to at least a portion of an upright support member. The strap member is connected to the connector member for holding the connector member against the support member. The hanger arm has a first end pivotally connected to the connector member and a free second end adapted to suspend an item therefrom. The adjustable support arm has a first end pivotally connected to the hanger arm and a second end matingly engageable against selective portions of the connector member to support the hanger arm in a selected angular relationship with respect to the upright support member.

4 Claims, 5 Drawing Sheets

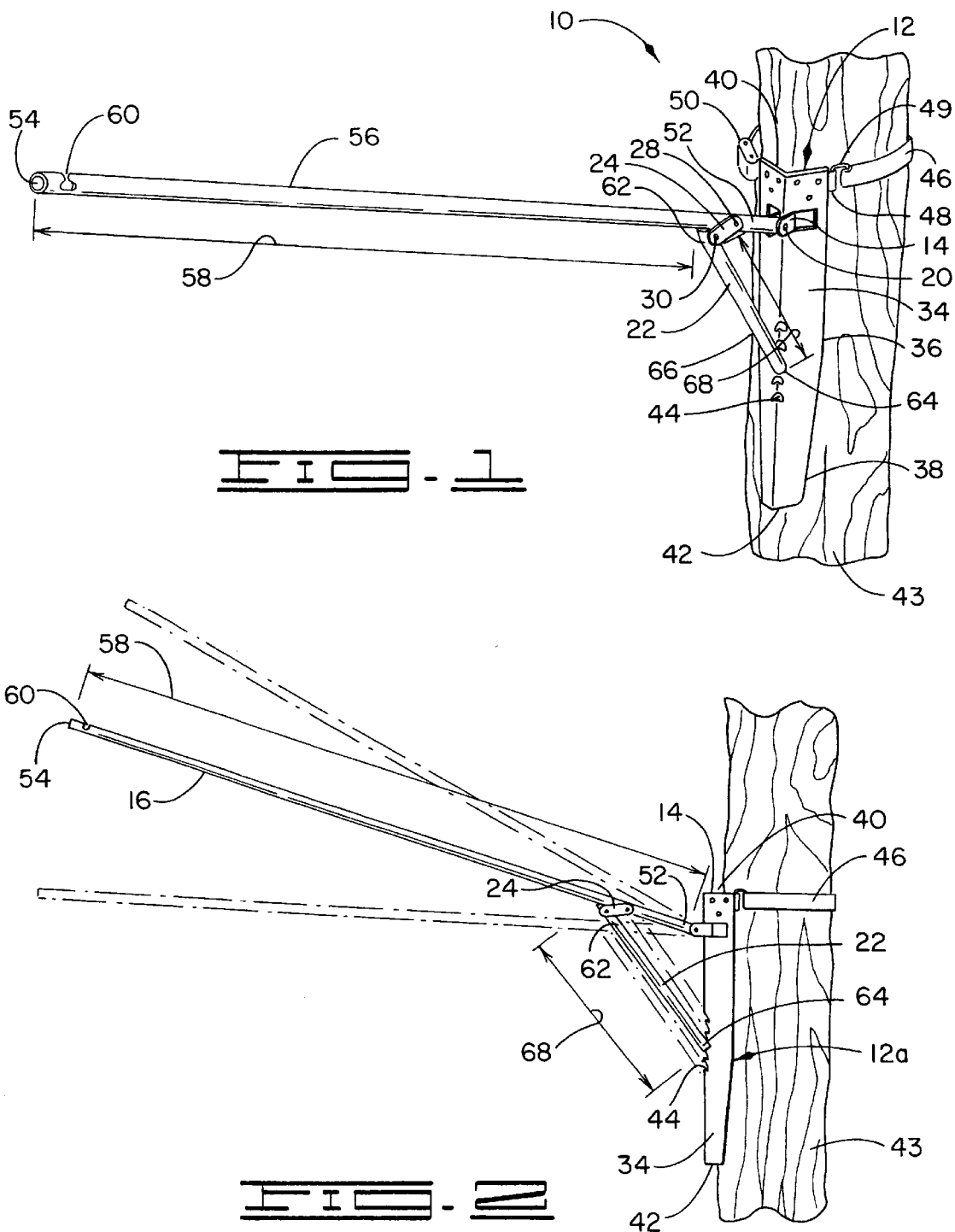

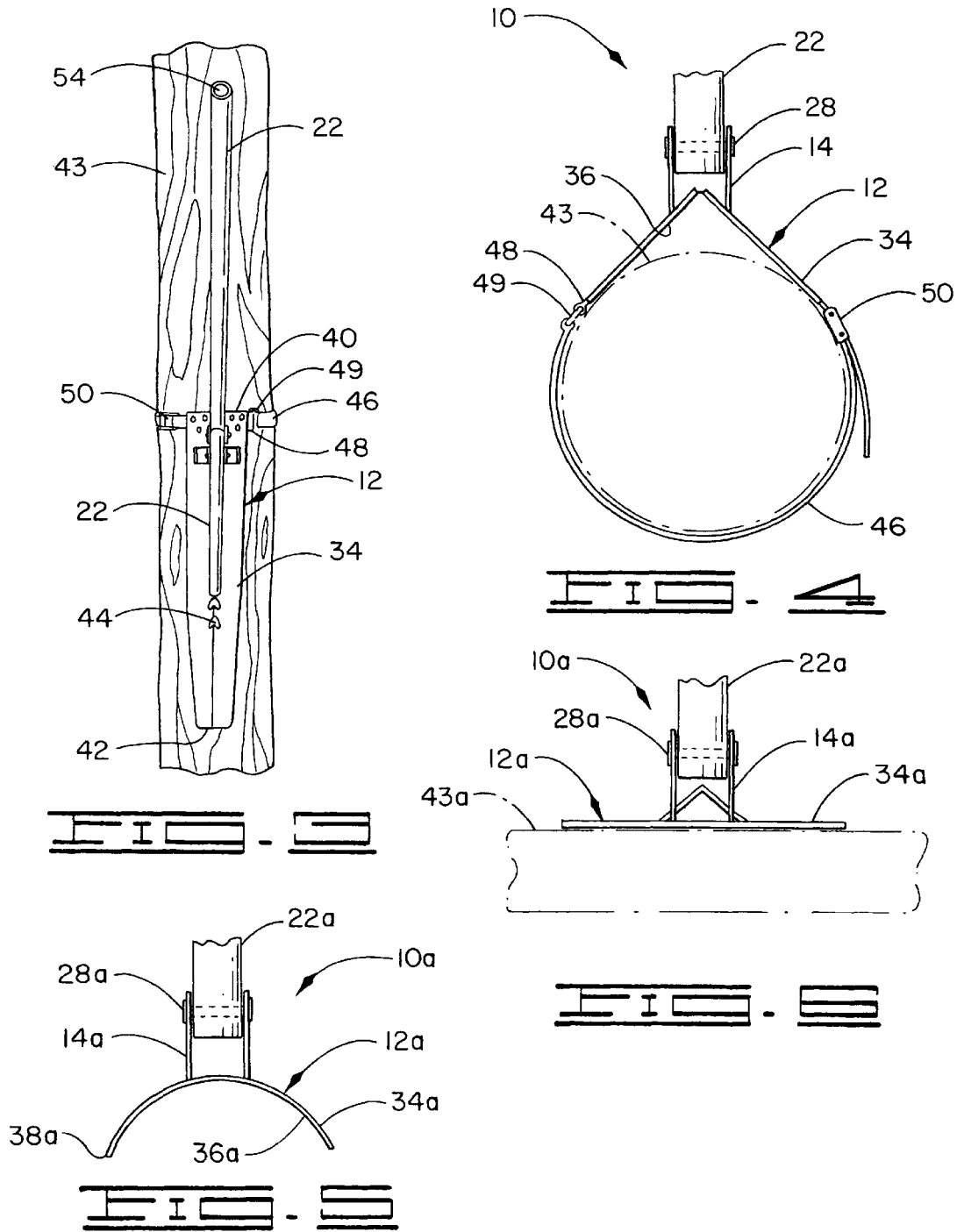

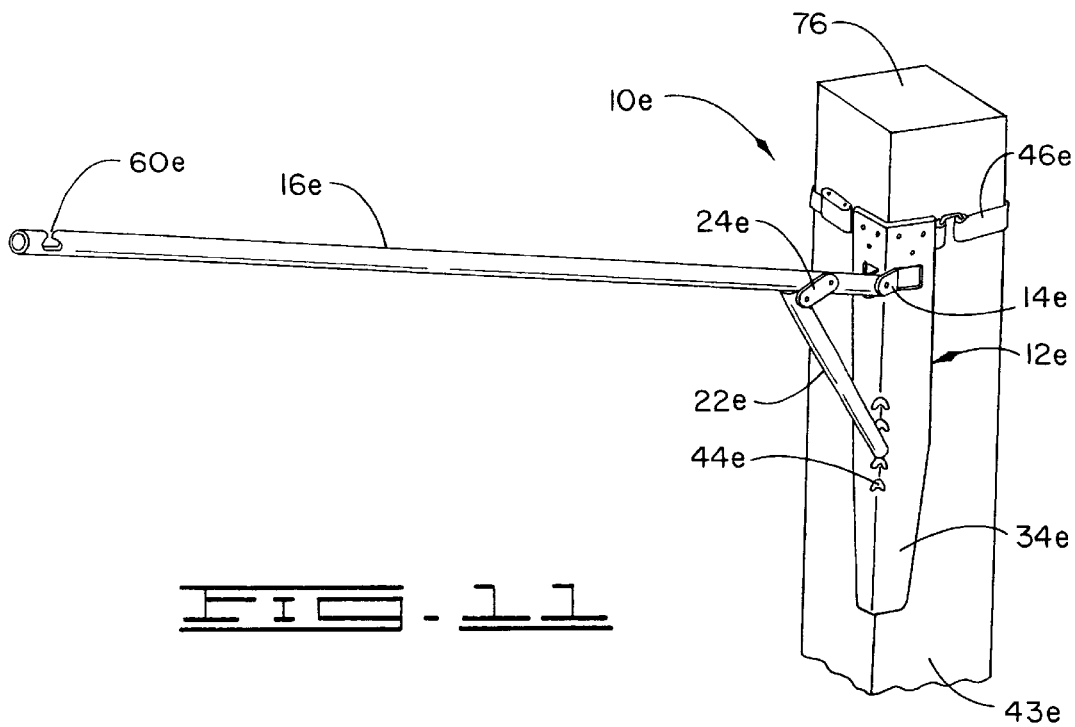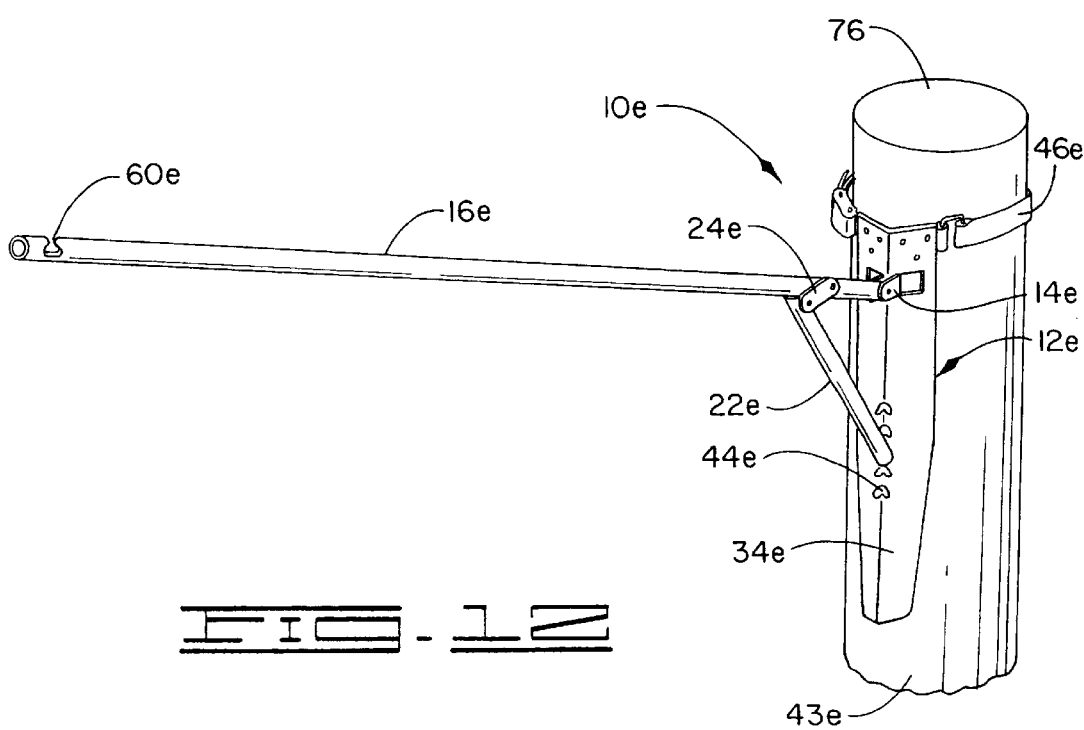

MULTI-PURPOSE HANGER

CROSS REFERENCE TO RELATED APPLICATIONS

Not Applicable.

STATEMENT TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

This invention generally relates to multi-purpose hangers and apparatus for hanging objects, and the like, and the methods of using same.

2. Background Information

Description of Related Art Including Information Disclosed Under 37 CFR 1.97 and 37 CFR 1.98

Devices for hanging objects have been developed and used for years. Most objects, such as clothing hangers, utilize a hook apparatus, as well as an outer framework. The hook apparatus connects to a reciprocal apparatus which permits the hanger to hang, while the outer framework holds the object, such as clothing. In the case of an apparatus of hanging plants or lanterns, a hook-type apparatus is usually supplied at one end, again, with a reciprocal apparatus which permits the hanger to hang, while extending therefrom is a framework which permits objects, such as a container containing a plant, or a lantern, to be disposed in the framework.

In some instances, it can be difficult, or inconvenient, to find a reciprocating apparatus in which to "hook" the hanger. In doors, the reciprocating apparatus must be installed in ceilings or walls. Outside, it can be difficult to find an acceptable "natural" reciprocating apparatus, such as a tree limb, at either the right height or the right location.

Therefore, there is a need felt within the art for a multi-purpose hanger which would permit a number of different objects to be hung from such a hanger, and in which it is easier to find and/or utilize an artificial or natural reciprocating apparatus in which to connect the multi-purpose hanger.

Further, there is a need felt in the art to provide an easy to use, adjustable hanger for indoor or outdoor use. Moreover, there is a need felt in the art to provide an easy to use, adjustable hanger for hanging objects outdoors, such as, but not by way of limitation, a plant in a container, birdseed, backpacks, lanterns, food, trash, party decorations, and the like. Such a device would be economical to manufacture and supply, easy for a user to use, relatively light weight, and would provide ease of control in raising and lowering the item being hung by a user.

SUMMARY OF THE INVENTION

A multi-purpose hanger for connecting to a surface is disclosed. The multi-purpose hanger is formed from at least a connector member, at least one strap member, a hanger member, and an adjustable arm member. The connector member is connected to a surface via the strap member. The hanger member connects to and extends away from the connector member and the hanger member is adjustably positioned and held in the position via a connection between the hanger member, the adjustable arm member and the connector member.

In other configurations of the multi-purpose hanger, a strap member may not be needed. The hanger member and/or the adjustable arm member may be formed from telescoping parts. The configuration of the connector member may be flat, concave, convex, a ninety degree angle, or any combination thereof. The multi-purpose hanger may have a top portion, which may be square, round, or any operative configuration. The connector member has a plurality of elements, namely, notches, pegs, grooves and/or apertures, which hold the adjustable arm member in place once the unconnected end of the adjustable arm member is disposed adjacent at least one of the elements. This connection results in the placement of the hanger member as well. In an alternative, the hanger member may have a plurality of elements, namely, notches, pegs, grooves and/or apertures.

A method of connecting a multi-purpose hanger to a surface is also disclosed. In this method, a multi-purpose hanger is provided which has a connector member having at least one attachment element, and a hanger member pivotally connected to the connector member, the hanger member having an adjustable arm member. The connector member is disposed adjacent a surface such that the attachment element is disposed and positioned adjacent the surface. The attachment element is activated such that the connector member is held firmly against the surface. The hanger member is raised into a selected position, and the adjustable arm member is positioned to hold the hanger member in the selected position. The adjustable arm member is then connected to the connector member to hold the hanger member in the selected position.

It is an object of the present invention to provide an apparatus for hanging a number of different items, the apparatus which may be quickly and easily connected and disconnected to a number if different surfaces, i.e., round surfaces, flat surfaces, concave surfaces, convex surfaces, irregular surfaces, and/or any combination thereof. It is a goal of the present invention to provide a multi-purpose hanger which may be attached easily and quickly to living surfaces, such as, but not by way of limitation, a tree, or may be connected to artificial (non-living) surfaces, such as, but not by way of limitation, a post, a wall, and the like. It is an object of the present invention to provide a multi-purpose hanger that is relatively light weight and portable. It is a goal of the present invention to provide a multi-purpose hanger that can be easily moved, and contained in a backpack or daypack. It is an object of the present invention to provide a multi-purpose hanger that is formed such that it is easy for a smaller operator to position the apparatus on a surface, as well as easy for the operator to elevate the "arm" which holds an item, such as, for example, but not by way of limitation, a lantern, such that the item can easily be moved both above and below the operator's head. It is a goal of the present invention to provide a multi-purpose hanger which is easily and quickly connected to a surface and disconnected from a surface, all without causing any significant damage to the surface.

BRIEF DESCRIPTION OF THE DRAWINGS

Other objects, features and advantages of the present invention will become more fully apparent from the following detailed descriptions of the preferred embodiments, the appended claims and the accompanying drawings in which:

FIG. 1 is a perspective view of the multi-purpose hanger connected to a tree trunk constructed in accordance with the present invention;

FIG. 2 is a side elevational view of the multi-purpose hanger of FIG. 1, but showing the positional change of the adjustable arm member via phantom lines and the resulting positional change of the hanger member via phantom lines; shown in FIG. 3 is a front elevational view of the multi-purpose hanger of FIG. 1;

FIG. 4 is a partial top plan view of the multi-purpose hanger of FIG. 1, but showing the ninety degree angel of the connector member in relation to the round tree trunk;

FIG. 5 is a partial top plan view of the multi-purpose hanger of FIG. 1, but showing the curved angle of the connector member;

FIG. 6 is a partial top plan view of the multi-purpose hanger of FIG. 1, but showing the flat angel of the connector member adjacent a flat surface;

FIG. 11 is still yet another embodiment of the multi-purpose hanger of FIGS. 1–2, but showing the multi-purpose hanger connected to a square post, and a top portion having a square configuration connected to the square post; and FIG. 12 is an embodiment similar to the one shown in FIG. 11, but showing the multi-purpose hanger connected to a round post, and a top portion having a round configuration connected to the round post.

DESCRIPTION OF THE PREFERRED EMBODIMENTS

Figure 7:
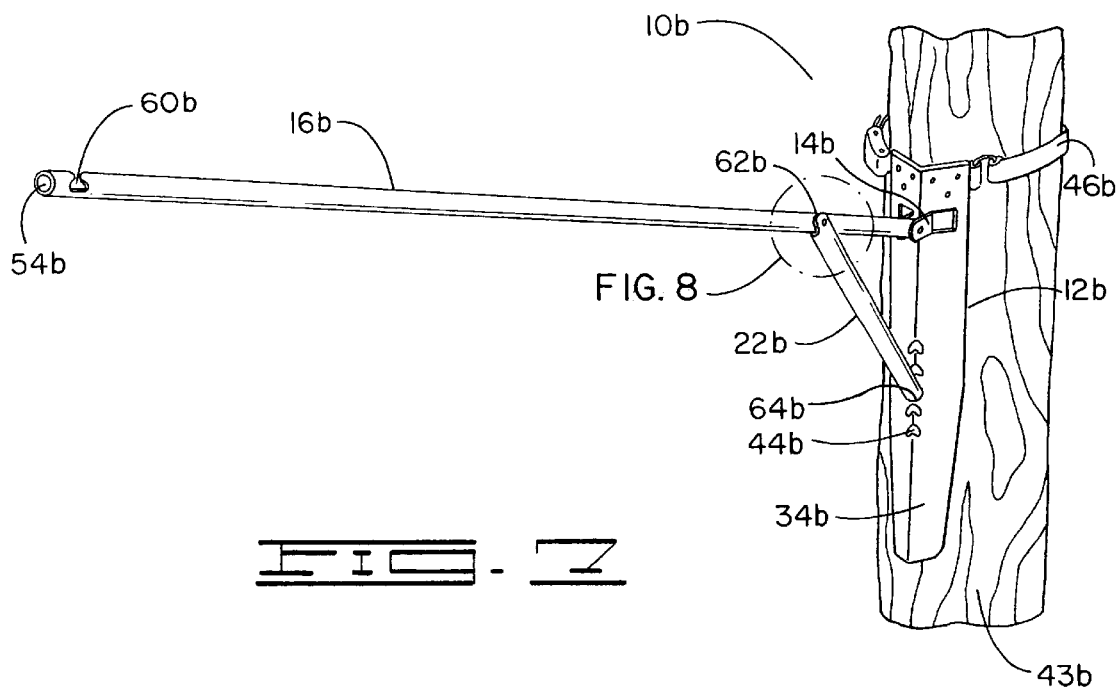
FIG. 7 is a perspective view of another embodiment of the multi-purpose hanger of FIG. 1, but showing an alternative embodiment for the adjustable arm member, and showing the absence of the hinge assembly.

The Embodiments and Methods of FIGS. 1–4

Apparatus, and methods for hanging items, as noted above, have been known in the art. Most of these apparatus and methods, however, are only adapted to a specific surface, and require specific reciprocating apparatus to be connected to a surface first, and are not easy, quick, light weight and readily mobile. The present multi-purpose hanger overcomes the limitations of previous apparatus.

Referring to FIGS. 1–4, the multi-purpose hanger 10 comprises a connector member 12. The connector member 12 has a dual flange member 14 which connects to a hanger member 16 via an upper aperture (not shown) in the hanger member 16 through which the dual flange member 14 is hingably, rotatably connected via a first nut and bolt assembly 20, or any other hinge and/or rotatable means known in the art. The hanger member 16 has an adjustable arm member 22 which is connected to the hanger member 16 via a hinge assembly 24. The hinge assembly 24 rotatably connects to the adjustable arm member 22 via a first lower aperture (not shown) and second nut and bolt assembly 28 and a second lower aperture (not shown) and a third nut and bolt assembly 30. It will be understood that, alteratively to the aperture and nut and bolt assembly, a pin assembly, a slot with pin assembly, or any other apparatus which would operate and function as shown and described herein which is known in the art would suffice in this, and all similar embodiments shown and/or described herein.

The connector member 12 has a first side 34, a second side 36, an outer periphery 38, a first end 40 and a second end 42.

The second side 36 is formed such that it may be disposed adjacent a selected surface 43; the second side optionally may comprise some type of padding known in the art as well. The first side 34 is formed to have a plurality of notches 44 (only one of the plurality of notches being designated by the numeral 44). It will be appreciated that notches, holes, pegs, grooves, and/or any combination thereof, or any other embodiment known in the art, may be utilized, so long as the multi-purpose hanger 10 operates in the manner shown and described herein. In the present embodiment shown in FIGS. 1–2, the first side 34 has a plurality of notches 44.

The connector member 12 also has a first connecting strap 46, a second connecting strap 48 and a connecting link 49. The connecting link 49 permits the first connecting strap 46 to be connected to the second connecting strap 48. At least one of the first or second connecting straps 46 and 48 will have a connector element 50 connected thereto, which permits the connector member 12 to be securely and tightly strapped to the selected surface 43, such as, for example, but not by way of limitation, a tree or a pole. The first and second connecting straps 46 and 48 wrap about the selected surface 43 and connect together via the connecting link 49. The connecting like 49 comprises a link with an opening. It will be understood that any apparatus which operates as shown and/or described herein may be utilized as a connecting link 49. The connector element 50 tightens the connected first and second connecting straps 46 and 48 together, and permits tensioning of the first and second connecting straps 46 and 48 such that the connector member 12 is held firmly against the selected surface 43. Such a connector element 50 may comprise, for example, but not by way of limitation, an adjustable buckle, adjustable rings, or any other apparatus known in the art.

In one alternative (not shown), the first and second connecting straps 46 and 48 are formed such that each connector strap has a connecting element 50 connected thereto to permit the first and second connecting straps 46 and 48 to be connected together. Such an example would be a hook and loop type of fastener, where, for example, but not by way of limitation, the first connecting strap 46 had the hook material, while the second connecting strap 48 had the loop material. In a further alternative (not shown), the connecting link 49 may also comprise various different fasteners, including, but not limited to, those described herein, as well as those known in the art. In still a further embodiment (not shown), the connector member 12 may comprise at least a portion of a connector element 50, such as, but not by way of limitation, loop material, and the selected surface 43 may also comprise at least another portion of the connector element 50, such as, but not by way of limitation, hook material, so that when the connector member 12 is disposed adjacent and in a connecting engagement with the selected surface 43 and the connector elements 50 thereon, the connector member 12 is held in a connecting engagement with the selected surface 43. In this alternative embodiment, any apparatus described and/or shown herein, or any apparatus known in the art, may be utilized to create and form the connection between the connector member 12 and the selected surface 43, so long as the multi-purpose hanger operates and functions as illustrated and/or described herein.

The hanger member 16 is usually cylindrically-shaped, but it will be appreciated that any shape may be utilized, so long as the hanger member 16 operates as described and/or shown herein. The hanger member 16 has a first end 52, a second end 54, and, in the present embodiment, but not by way of limitation, a cylindrical outer periphery 56 and a length 58. The hanger member 16 may also have at least one hanger notch 60, although it will be appreciated that any peg, hook, notch, aperture, or any combination thereof, or any other apparatus which would permit the hanger member 16 to function as illustrated and/or described herein, may be used. When the hanger member 16 has, for example, but not by way of limitation, a hanger notch 60, the hanger notch 60 will often be positioned near the second end 54 of the hanger member 16. It will be appreciated that more than one hanger notch 60, that is, a plurality of hanger notches (not shown) may be utilized. It will further be understood that one or more hanger notches 60 may be located in various positions along the length 58 of the hanger member 16 (not shown). Further, any type of hanger notch 60, described herein, may be utilized, either singularly, or in combination, and in any position. When a hook is utilized, it will be appreciated that the hook may be rotatable.

The adjustable arm member 22 is also usually cylindrically-shaped, but it will be appreciated that any shape may be utilized, so long as the hanger member 16 and the multi-purpose hanger 10 function as described and/or shown herein. The adjustable arm member 22 has a first end 62, a second end 64, an outer periphery 66 and a length 68. An arm aperture (not shown) is formed in the first end 62, permitting the third nut and bolt assembly 30 to connect the adjustable arm member 22 to the hinge assembly 24.

The first end 62 of the adjustable arm member 22 is connected to the hinge assembly 24 via the third nut and bolt assembly 30, the hinge assembly 24 is connected to the hanger member 16 via the second nut and bolt assembly 28. The second end 64 of the adjustable arm member 22 is formed to connected to at least one of the plurality of notches 44 in the connector member 12, although it will be appreciated that the adjustable arm member 22 may be formed to connect to, or through, one or more notches 44, or the alternatives, such as, but not by way of limitation, apertures, pegs, and/or grooves. It will be understood that the hingeable engagement of the adjustable arm member 22 to the hanger member 16, as shown in FIGS. 1–2, permits the higher and lower, vertical adjustment of the hanger member 16.

In a method of use, the multi-purpose hanger 10 is connected to a selected surface 43, such as, but not by way of limitation, a tree trunk. The second side 36 of the connector member 12 is disposed adjacent the tree trunk, and the first connecting strap 46 is extended about the tree trunk and connected to the connecting link 49 of the second connecting strap 48. The connector element 50 is activated via an operator pulling the first connecting strap 46, thereby tightening the engagement of the first connecting strap 46, the second connecting strap 48 and the connector member 12 about the (tree trunk) selected surface 43, resulting in a tight, non-slippable engagement between the connector member 12 and the selected surface 43.

An item, such as, but not by way of limitation, a lantern (not shown), may be connected to the hanger member 16 by sliding the ring usually connected to the top of a lantern (not shown) over the second end 54 of the hanger member 16 and into the hanger notch 60. The hanger member 16 is then lifted into a position by lifting the adjustable arm member 22 and disposing the second end 64 of the adjustable arm member (through which at least a portion of the second end 64 is formed at least a hollow portion) against one of the plurality of notches 44, thereby engaging and holding the hanger member 16 in a fixed position selected by the operator. It will be appreciated, as shown in FIG. 2, that engaging the second end 64 of the adjustable arm member 22 in one of the higher notches of the plurality of notches 44 results in the higher position of the second end 54 of the hanger member 16, while engagement of the second end 64 of the adjustable arm member 22 in one of the lower notches of the plurality of notches 44 results in the lower position of the second end 54 of the hanger member 16. It will also be understood that the multi-purpose hanger 10 is easily and quickly connected to the selected surface 43 and also easily and quickly disconnected from the selected surface 43, without causing any significant damage to the surface.

The Embodiments and Methods of FIGS. 5–6

The connector member 12 shown in FIGS. 1–4 has formed therein a ninety degree (90%) angle, which extends the length of the connector member 12, namely, from the first end 40 to the second end 42. However, it will be appreciated that the connector member 12 may, partially or totally, have a different configuration.

Referring to FIGS. 5–6, as shown herein and designated by the general reference numeral 10*a* is a multi-purpose hanger and another connector member 12*a* constructed in accordance with the previously disclosed multi-purpose hanger 10. In an alternative, however, the connector member 12*a* has a round configuration extending through a part or all of the connector member (as shown in FIG. 5), or the connector member 12*a* may have, partially or totally, a flat configuration (a partial flat configuration is shown in FIG. 6). It will be appreciated that the connector member 12 may also have other convex, concave, or any other configuration shown and/or described herein, or known in the art, so long as the connector member 12*a* operates as shown and/or described herein.

In these embodiments, the multi-purpose hanger 10*a* will operate in the methods described and shown previously herein. For application to a selected surface 43*a* which is flat, it will be appreciated that other elements may be utilized to connect the connector member 12*a* to the flat surface. Such elements include, but are not limited to, screws, bolts, nails, hook and loop-type material, and any other elements known in the art which would permit the multi-purpose hanger 10*a* to operate and function in the manner shown and/or described herein.

Figure 8:
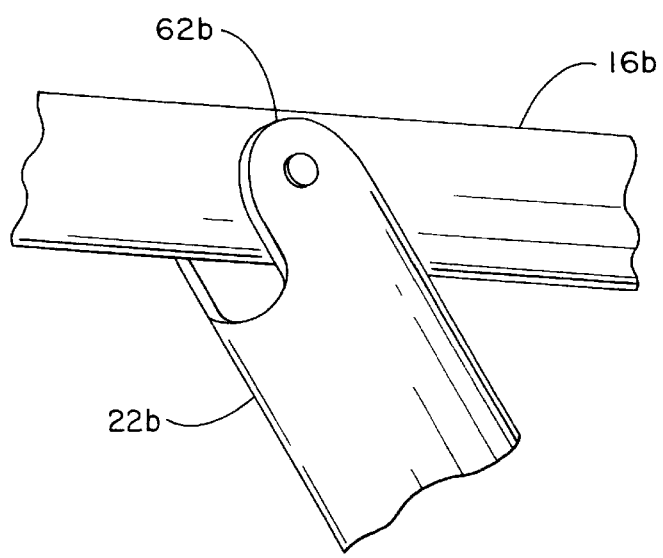
FIG. 8 is a sectional view of the alternative embodiment of the adjustable arm member of FIG. 7.

The Embodiments and Methods of FIGS. 7–8

Referring to FIGS. 7–8, as shown herein and designated by the general reference numeral 10*b* is a multi-purpose hanger and another adjustable arm member 22*b* constructed in accordance with the previously disclosed multi-purpose hanger 10. In an alternative embodiment, however, the hinge assembly 24 (FIGS. 1–2) is eliminated, and, as shown in FIGS. 7–8, the first end 62 of the adjustable arm member 22*b* is modified as illustrated (FIGS. 7–8) to permit rotation, or pivoting, of the adjustable arm member 22*b* in its connection with the hanger member 16*b*.

In a method of use of this alternative embodiment, it will be appreciated that the multi-purpose hanger 10*b* will operate in the methods described and/or shown previously herein.

Figure 9:
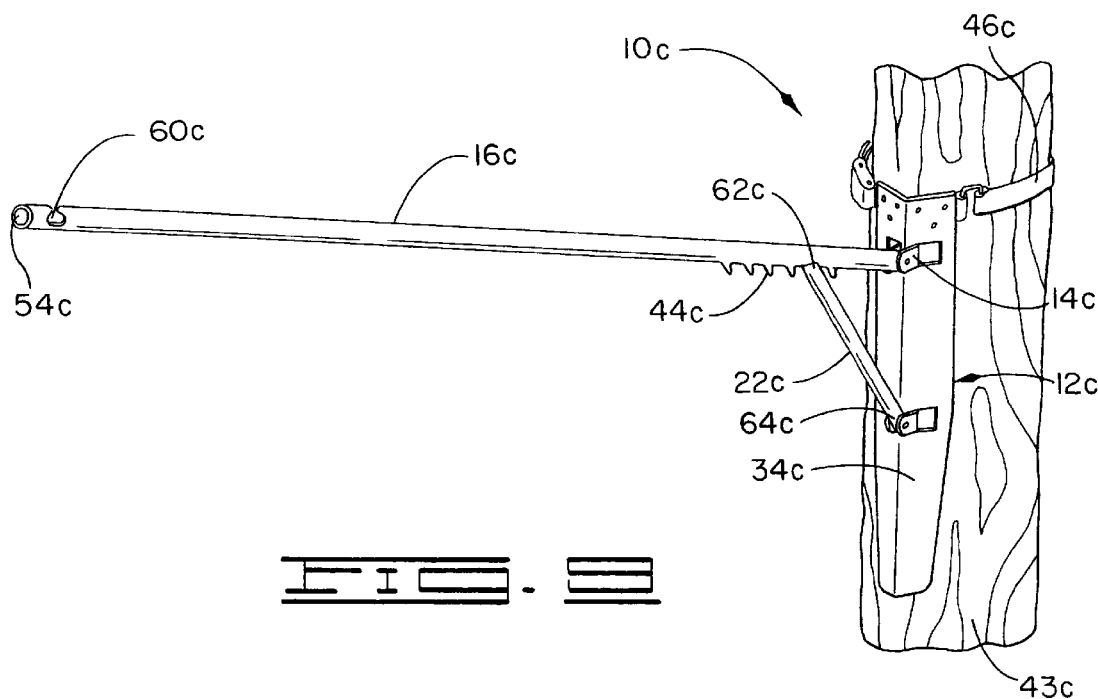
FIG. 9 is a perspective view of yet another embodiment of the multi-purpose hanger of FIG. 1, but showing another alternative embodiment for the adjustable arm member as well as the connector member and the hanger member, resulting in a different connection among these elements.

The Embodiments and Method of FIG. 9

Referring to FIG. 9, as shown herein and designated by the general reference numeral 10*c* is a multi-purpose hanger and another alternate embodiment constructed in accordance with the previously disclosed multi-purpose hanger 10. In this alternative embodiment, however, the hinge assembly (not shown), or the alternative adjustable arm member 24*c* described immediately above, could be altered to permit the hinge assembly (not shown) and/or the adjustable arm member 24*c* to be hingeably connected in the manner described and/or shown herein to the connector member 12c rather than the hanger member 16c. In the present embodiment, the hanger member 16c has a plurality of notches 44c. It will be understood that any alternative to a plurality of notches shown and/or described herein or known in the art may be utilized. This alternative embodiment permits the hanger member 16c to be positioned via the adjustable arm member 22c in a manner similar to the one shown and described previously herein.

In a method of use of this alternative embodiment, it will be appreciated that the multi-purpose hanger 10c will operate in the methods described and shown previously herein, with the exception that the second end 64c of the adjustable arm member 22c is hingeably connected to the connector member 12c, and the first end 62c of the adjustable arm member 22c is positioned adjacent at least one of the plurality of notches 44c on the hanger member 16c to position the hanger member 16c in the desired position.

Figure 10:
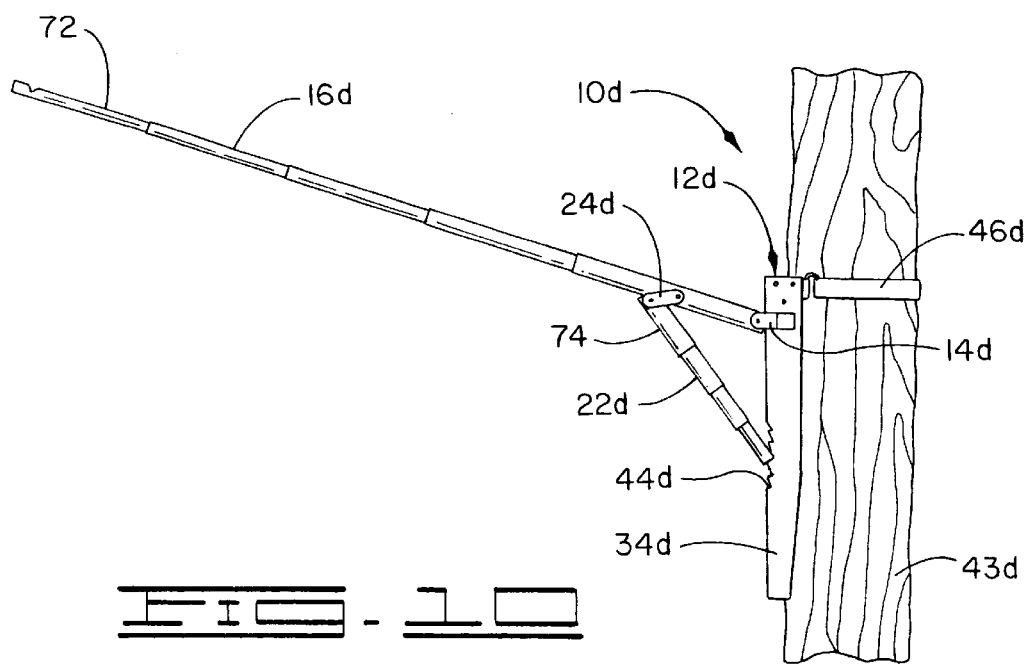
FIG. 10 is a side elevational view of still another embodiment of the multi-purpose hanger of FIGS. 1–2, but showing a telescoping hanger member and a telescoping adjustable arm member.

The Embodiments and Methods of FIG. 10

Referring to FIG. 10, as shown herein and designated by the general reference numeral 10d is a multi-purpose hanger and another alternate embodiment constructed in accordance with the previously disclosed multi-purpose hanger 10. In this alternative embodiment, however, the hanger member 16d is formed as a telescoping hanger member 16d, as shown in FIG. 10. That is, the hanger member 16d may have a plurality of hanger member parts 72 (only one of the plurality of hanger member parts designated by numeral 72) which form the hanger member 16d, which may be connected together via an operator to form the hanger member 16d (not shown), or, alternatively, each of the plurality of hanger member parts 72 may fit one inside the other and extend and lock into place to form the "telescoping", i.e., elongated hanger member 16d, as shown in FIG. 10. Such telescoping parts of each type are known in the art, and various ways of locking such telescoping parts together are known in the art. Such an arrangement permits a collapsibility of the hanger member 16d, permitting ease of use and/or transport.

Similarly, it will be appreciated that the adjustable arm member 22d, as shown in FIG. 10, may also, optionally, be formed of any telescoping elements shown and/or described herein, or known in the art. The adjustable arm member 22d illustrated in FIG. 10 has a plurality of adjustable arm member parts 74 which are interlocked together via any method described and/or shown herein, or known in the art.

In a method of use of either of these alternative embodiments, it will be appreciated that the multi-purpose hanger 10d will operate in the methods described and/or shown previously herein.

The Embodiments and Methods of FIGS. 11–12

Referring to FIGS. 11–12, as shown herein and designated by the general reference numeral 10e is a multi-purpose hanger and another alternate embodiment constructed in accordance with the previously disclosed multi-purpose hanger 10. In this alternative embodiment, however, the connector member 12e has a top portion 76 connected thereto. The top portion 76 fits over the top of, for example, but not by way of limitation, a fence post, a mail box post, or the like, when the multi-purpose hanger 10e is connected thereto. Such a top portion 76 could comprise a square box-type shape having an opening (FIG. 11), a cylindrical shape having one closed end (FIG. 12), or any other shape or configuration, or combination of shapes and/or configurations, known in the art.

In a method of use of either of these alternative embodiments, it will be appreciated that the multi-purpose hanger 10e will operate in the methods described and shown previously herein. It will be understood that the top portion 76 may be applied to the top of a post either before the connector member 12e is firmly connected to the selected surface 43e, or, alternatively, the top portion 76 may be applied to the top of a post after the connector member 12 is firmly connected to the selected surface 43e. The top portion 76 may rest above the elements of the multi-purpose hanger 10e, as shown in FIGS. 11–12. It will be appreciated, however, that the top portion 76 may extend over the upper portion of the multi-purpose hanger 10e, namely, a portion of the first end 40e of the connector member 12e and over at least a portion of the first and second connecting straps 46e and 48e, respectively, including at least a portion of the connecting link 49e and the connector element 50e (not shown).

Changes may be made in the embodiments of the invention described herein, or in parts or elements of the embodiments described herein, or in the sequence of steps of the methods described herein, without departing from the spirit and/or scope of the invention as defined in the following claims.

What is claimed is:

1. A hanger, comprising:

a connecting member having a surface configured to substantially conform to at least a portion of an upright support member;

a strap member connected to the connecting member and extendable about the support member for holding the connecting member against the support member;

a hanger arm having a first end pivotally connected to the connector member and a free second end adapted to suspend an item therefrom; and an adjustable support arm having a first end pivotally connected to the hanger arm a distance from the first end of the hanger arm and a second end matingly engageable against selective portions of the connector member to support the hanger arm in a selected angular relationship with respect to the upright support member, the second end of the support arm disengageable from the connecting member solely by a generally upward movement of the support arm to permit the angular relationship of the hanger arm with respect to the upright support member and thus the position of the item suspended from the second end of the hanger arm to be altered without altering the position of the connector member.

2. The hanger of claim 1 wherein the connecting member further comprises a plurality of upwardly oriented notches in which the second end of the adjustable support arm is matingly engageable to support the hanger arm in a selected angular relationship with respect to the upright support member and disengageable solely by a generally upward movement of the support arm.

3. The hanger of claim 2 wherein the notches of the connecting member are arranged longitudinally along the connecting member.

4. The hanger of claim 1 wherein the second end of the hanger arm is provided with a notch for receiving a portion of the item to be suspended.

\* \* \* \* \*